United States Patent [19]
Schmidt et al.

[11] Patent Number: 5,901,049
[45] Date of Patent: May 4, 1999

[54] TWO-TIERED PLUG FOR TWO CHIP CARDS

[75] Inventors: Helge Schmidt, Speyer; Gerhard Ackermann, Altlussheim, both of Germany

[73] Assignee: Siemens Aktiengesellschaft, Munich, Germany

[21] Appl. No.: 08/977,612

[22] Filed: Nov. 25, 1997

[30] Foreign Application Priority Data

Nov. 29, 1996 [DE] Germany .............................. 196 49 598

[51] Int. Cl.$^6$ ................................................... H05K 7/10
[52] U.S. Cl. ........................ 361/787; 361/785; 361/790; 361/791; 439/159; 439/59; 439/60; 439/62; 439/92; 439/61; 257/686; 257/690; 257/692; 235/441; 235/492
[58] Field of Search ............................... 439/188, 59, 60, 439/62, 61, 92, 159; 361/787, 785, 790, 791; 257/679, 686, 684, 685, 688, 690, 692, 694, 698; 235/441, 492

[56] References Cited

U.S. PATENT DOCUMENTS

| | | |
|---|---|---|
| 5,098,306 | 3/1992 | Noschese et al. . |
| 5,299,089 | 3/1994 | Lwee ........................................ 361/684 |
| 5,324,204 | 6/1994 | Lwee .......................................... 439/64 |
| 5,375,037 | 12/1994 | La Roux .................................. 361/684 |
| 5,490,792 | 2/1996 | Sugita ..................................... 439/159 |
| 5,643,001 | 7/1997 | Kaufman et al. ...................... 439/159 |
| 5,655,918 | 8/1997 | Soh ......................................... 439/159 |
| 5,714,742 | 2/1998 | Ieda ....................................... 235/441 |

FOREIGN PATENT DOCUMENTS

| | | |
|---|---|---|
| 0 529 350 A2 | 3/1993 | European Pat. Off. . |
| WO 95/30259 | 11/1995 | WIPO . |
| WO 96/32764 | 10/1996 | WIPO . |

*Primary Examiner*—Leo P. Picard
*Assistant Examiner*—David Foster
*Attorney, Agent, or Firm*—Hill & Simpson

[57] ABSTRACT

An electronic device has an opening for up to two data carrier devices or, respectively, chip cards with row-type contact surfaces positioned alongside one another. The devices or, cards are stackable over one another in offset fashion. In a region of the terminal side lying opposite the plug opening it comprises two rows of contact springs lying next to one another, said rows being spatially offset upwards by the height of a card, and also offset in the insertion direction in a manner corresponding to the card offset. The resilient ends at the plug side of these contact springs respectively contact the contact surfaces of inserted data carriers from above.

5 Claims, 3 Drawing Sheets

TWO-TIERED PLUG FOR TWO CHIP CARDS

BACKGROUND OF THE INVENTION

1. Field of the Invention

The present invention relates generally to the field of electronic devices, and, more particularly, the present invention relates to a two-tiered plug for two chip cards.

2. Description of the Related Art

With increasing storage capacity of ICs, entirely new fields of application are opening up for memory chip cards. In particular, in the field of mobile telecommunication, the contacting of two multimedia cards, as they are known, is required in a minimum physical space. In the future, multimedia memory cards are expected to take over functions as data carriers for large quantities of data, similar to the function of diskettes or CD-ROMs in the past. With respect to hand-held units, what is concerned is not the storage of 200 private telephone numbers, as is already possible by means of the known SIM cards, but rather exchangeable cards on which, for example, extensive software programs or complete telephone directories are stored.

SUMMARY OF THE INVENTION

One object of the present invention is to provide contacting capability for at least two memory cards that is physically as compact as possible. Preferably, each of the cards has surface contacts lying next to one another in a row.

In accordance with the present invention, a two-tiered plug with a flat insulating body that can be mounted on a system carrier has a first frontal side with a plug opening for up to two card-shaped data carrier devices that can be stacked over one another with their main surfaces offset. Each data carrier comprises at least one integrated semiconductor circuit and several contact surfaces that are connected therewith and lie alongside one another in a row on one of the main surfaces.

Two spatially offset rows of contact springs are adjacent to one another in the region of a terminal side opposite the plug opening. The ends at the terminal side are respectively fashioned as plug terminals. Resilient ends at the plug side of the contact springs of the first, lower row contact the contact surfaces of a plugged first lower card from above. The corresponding spring ends of the second upper row which is offset upwards by the height of a card in relation to the first row corresponding to the thickness of the cards, and which, corresponding to the card offset in the plug direction, is offset by this amount in the direction of the plug opening, and contact the contact surfaces of a plugged second, upper card from above.

The invention is explained in more detail below with reference to the exemplary embodiments set forth in the figures.

DESCRIPTION OF THE PREFERRED EMBODIMENTS

Figure 2:
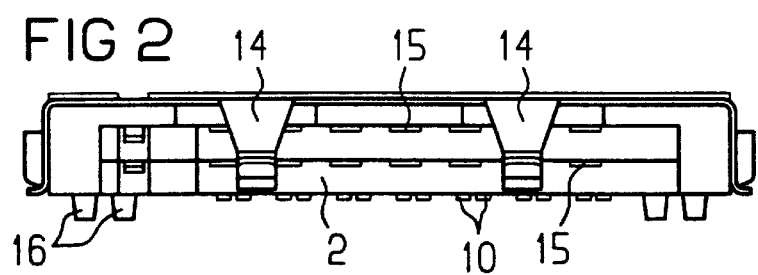
FIG. 2 illustrates a plug side of the plug in FIG. 1.
Figure 3:
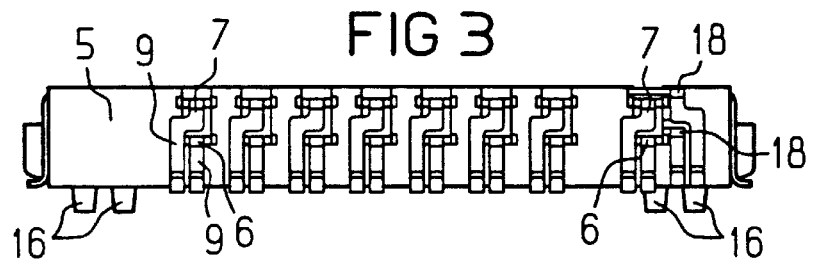
FIG. 3 illustrates a terminal side of the plug in FIG. 1.
Figure 5:
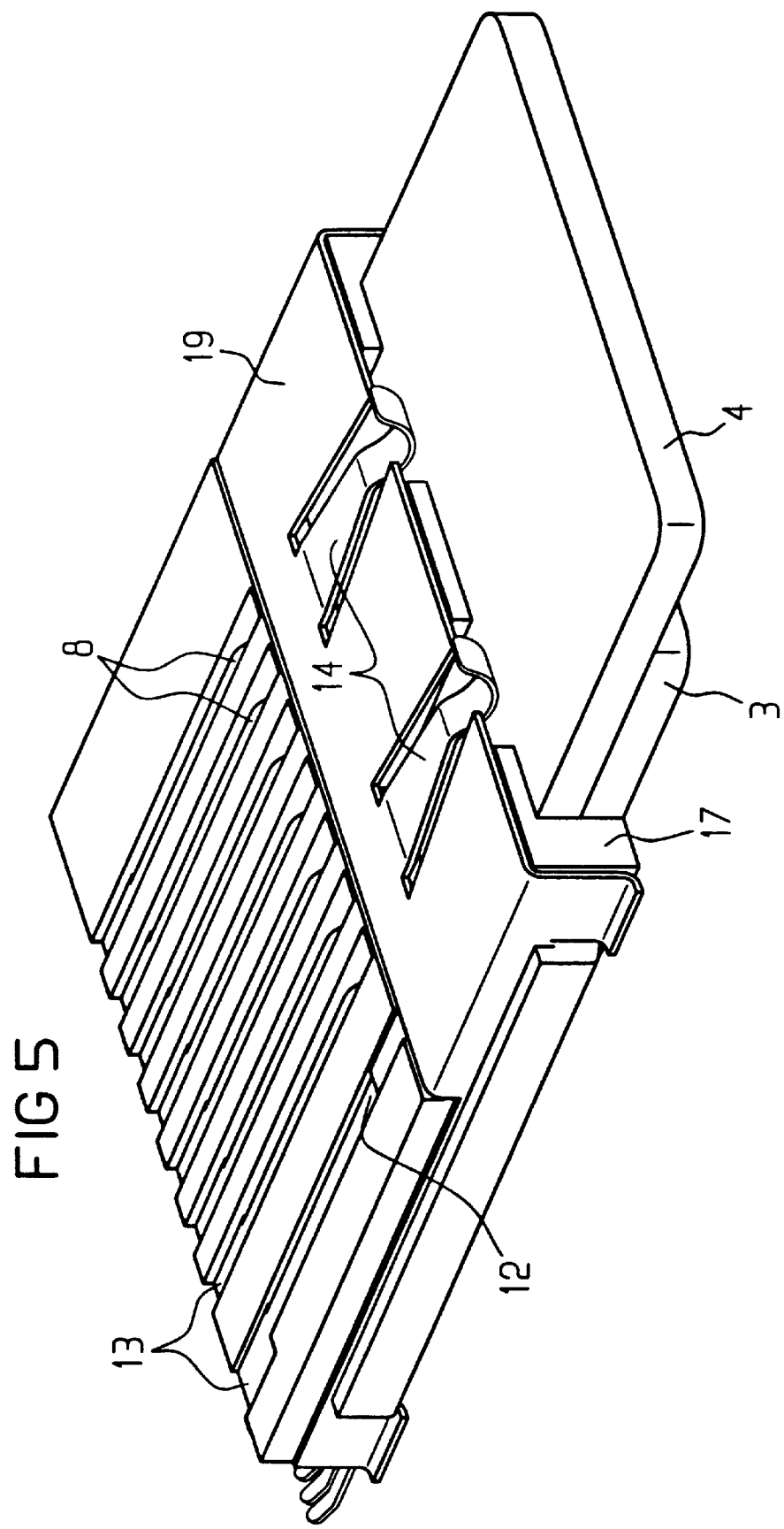
FIG. 5 illustrates the plug according to the invention outfitted with cards, in an oblique perspective view from the plug side.

The plug is fastened on a system carrier (not shown for clarity), for example by means of feet 16 that can be seen in FIGS. 2 and 3. This carrier can thereby be, for example, a circuit board, or also the housing wall of an electronic system. It can be seen in FIG. 5 that the cross-section of the insulating element 1 is essentially U-shaped, whereby the base is broad and the U-limb 17 is only slightly longer than the thickness of two cards 3 and 4 stacked on one another. The insulating element 1 is accordingly essentially open downwardly, so that the first card 3, which is always first plugged into the lower card position by the pressure means 14 (further explained below), is pressed directly against the surface of the system carrier on which the plug is mounted.

The plug comprises two spatially offset row-type contact spring assemblies. The two rows of contact springs, which each run horizontally, are vertically offset by the height of a card. (see FIG. 2) However, the spring ends of the contact springs, whose frontal surfaces do not protrude into the card space or, respectively, into the plug opening 2, cannot themselves be seen. Rather, only the contact knobs 15 that are arranged at the ends of the springs and that protrude downward into the card space can respectively be seen. The offset of the spring ends of the second, upper row in the direction of the plug opening 2 is provided by the overhang of the upper cards 4 in relation to the lower cards 3 that can be seen in FIG. 5. The cards 3 and 4 are respectively pushed into the plug opening 2 until they meet stop surfaces in the interior of the insulating element 1 that comprise the desired offset in the insertion direction. This offset can for example be about 5 mm, given plug dimensions of 35×35 mm.

The exemplary embodiment shown in all the figures has eight contact springs lying in a row next to one another, thus on a memory card on whose main surface eight contact surfaces lie in a row next to one another. However, the inventive concept can easily be realized with a number of row locations deviating from this exemplary number. Specifically, a row can be expanded to 10 contact locations or, respectively, switching locations.

Figure 1:
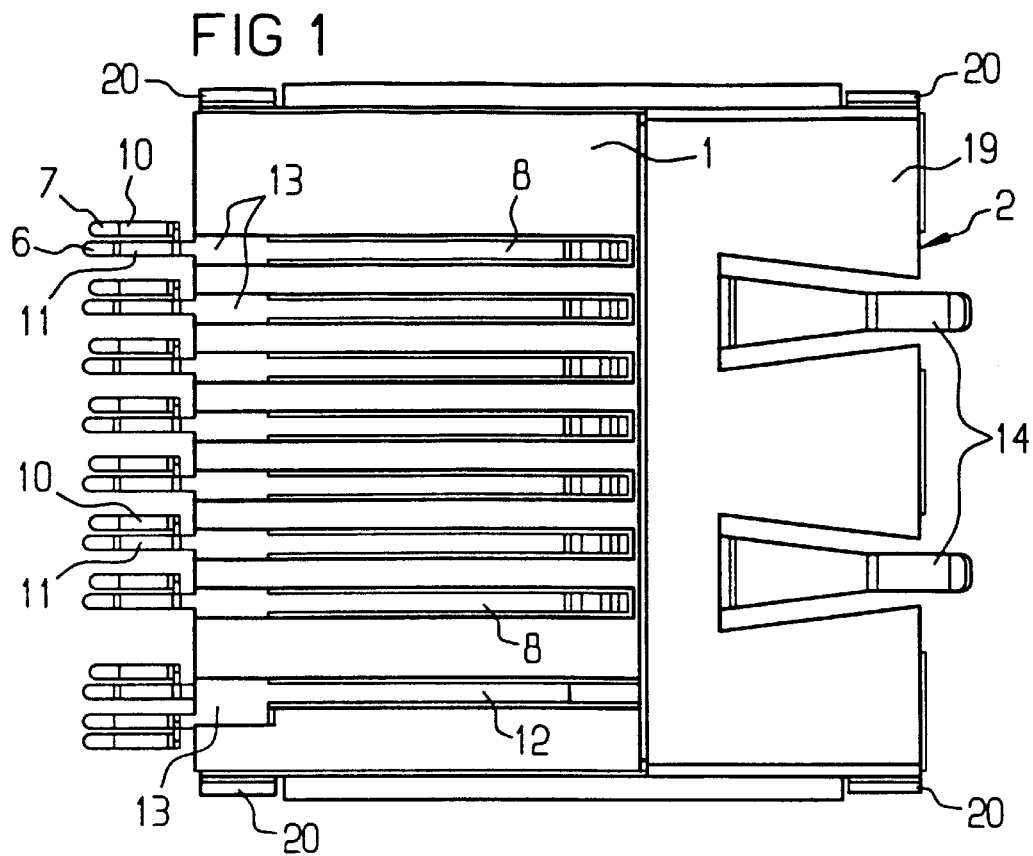
FIG. 1 illustrates a top view of the inventive plug.
Figure 4:
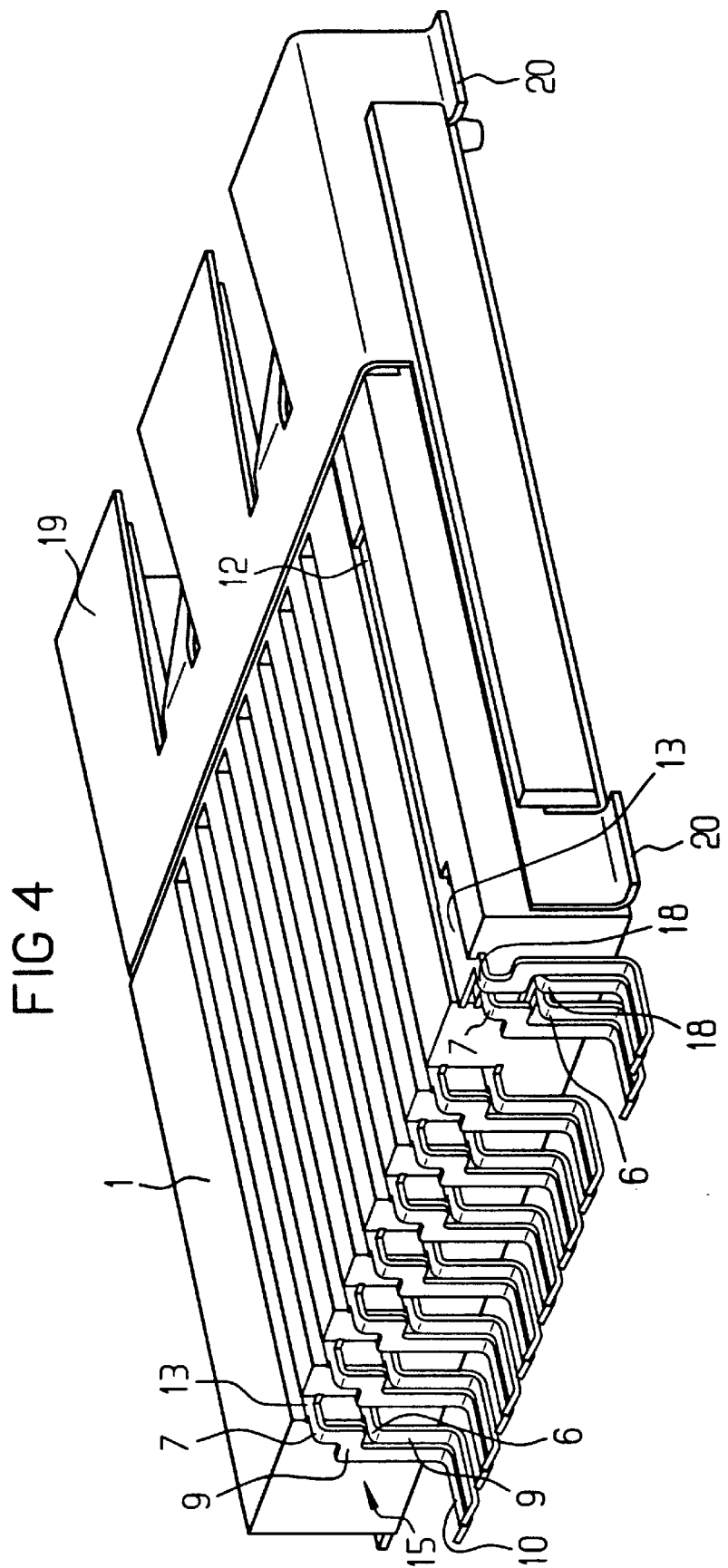
FIG. 4 illustrates the plug in a perspective view oblique to the terminal side.

It can be seen in FIGS. 3 and 4 that the plug terminals 6 and 7 project in the insertion direction from the terminal side 5, the second frontal side of the plug, lying opposite the plug opening 2. The plug terminal 6 and 7 project in and first bent downward to form a middle segment 9 that runs parallel to the terminal side, and are subsequently bent to form a soldering segment 10 that runs parallel to the system carrier. The middle segment 9 of the second, upper row of terminal plugs is respectively constructed with an S-shaped bend, so that the upper and lower contact springs belonging to the same row location can be connected pair-by-pair to a soldering pad of the system carrier by means of their soldering segments 10 and 11 (cf. FIG. 1). The segments lie closely alongside one another due precisely to this bending. The type of routing described, which leads in principle to contact segments 10 and 11 lying next to one another in planar fashion, is also advantageous for incompatible cards that are not to be connected in parallel by means of a common soldering pad.

It is advantageous to provide another optional switch function in the plug, so that the electronics can recognize a manipulation of the cards. For example, this may be a subsequent insertion of the second cards or pulling of cards. For this purpose, in the inventive plug, a switch is provided for at least one of the cards 3 and 4, which is respectively fashioned by one of the above-described normal contact springs and by an additional switching spring whose spring end 12 is arranged parallel to the spring end, running closely thereunder. This contact spring end is highly compressed to the switching spring by an inserted card 3 or 4 to such an extent that the desired switch contact is produced. The course of the plug terminals of these two independent switches (one each for the upper and for the lower card) can be seen in FIGS. 1 or, respectively, 4. A normal plug terminal 6, 7 and a switching spring terminal 18 is accordingly provided for each switch.

To save additional fastening elements, it is advantageous if the contact springs and the switching springs respectively comprise a fastening segment 13 arranged between the plug terminal 6 and 7 and the spring end 8. The segment is widened in relation to the spring end 8, and by means of which the contact springs or, respectively, switching springs are pressed in via a slight overlap (a few 1/100 mm) in the insulating element 1.

As mentioned, the lower card position is always first inserted through the plug opening 2. A U-shaped stamped part can be pushed over the insulating element 1 as a soldering clip. A pressure means 14, for example, a spring, integrated in the soldering clip 19 presses the lower card against the surface of the system carrier, or, respectively, presses the upper card onto the surface of the lower card. By means of this vertical positioning and unambiguous positioning, the contacting of the cards, even of the single card, to the associated row of contact springs is secured. Thus, slipping out, which would otherwise be possible, is prevented. The pressure spring 14 can be realized in various embodiments. For example, a simple spring arm, a spring arm with a rectangular shape or a pressure spring separated from the soldering clamp and mounted in the housing as a separate part can be provided. The connection of the plug to a circuit board preferably ensues in SMD technology, e.g. by soldering the pockets 20 to the soldering clip 19. An embedding of the plug on the system carrier by means of ultrasound technology or by means of hot stamping is also possible.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. An electronic device for use with first and second data carriers comprising:

a first frontal side having an opening;

a plurality of data carrier devices in said opening stacked over one another with respective front surfaces offset, said data carrier devices each comprising at least one integrated semiconductor circuit and a plurality of contact surfaces located adjacent one another in a row on a surface of the data carrier;

two spatially offset rows of contact springs lying next to one another in a terminal side of the electronic device opposite the opening having ends at the terminal side respectively fashioned as plug terminals;

wherein resilient ends of contact springs of a first, lower row contact as disposed to make contact with surfaces of an inserted first, lower data carrier from above; and wherein spring ends of a second, upper row, which is offset upwards by substantially a height of a data carrier in relation to the spring ends of the first row, are offset in the insertion direction from the spring ends of the first row and are disposed to make contact with contact surfaces of an inserted second, upper data carrier from above.

2. An electronic device according to claim 1, wherein terminals which project in an insertion direction from the terminal side are first bent downward to form a middle segment parallel to the terminal side and form a contact segment, a middle segment of the second, upper row of terminal plugs is respectively constructed with an S-shaped bend, so that upper and lower contact springs belonging to a same row location are connected pair-by-pair to a system carrier by means of contact segments lying substantially flat and adjacent to one another.

3. An electronic device according to claim 1, further comprising a switch connecting at least one of the data carriers, said switch being formed by a contact spring and an additional switching spring, whose spring end is parallel to a spring end running closely thereunder and which is highly compressed to the switching spring by an inserted data carrier.

4. An electronic device according to claim 3, wherein the contact spring and the switching spring further comprise a fastening segment between the plug terminal and the spring end, which is widened in relation to a spring end and fit in an insulating element with a slight overlap.

5. An electronic device according to claim 1, further comprising a resilient member which applies a vertical force against a top of the data carrier.

* * * * *